United States Patent [19]
Godtner

[11] 3,801,254
[45] Apr. 2, 1974

[54] APPARATUS FOR MAKING TUBULAR PARISONS OF THERMOPLASTIC MATERIAL

[75] Inventor: Albert Godtner, Hennef, Germany

[73] Assignee: Kautex-Werk Reinold Hagen, Bonn-Holzlar, Germany

[22] Filed: Jan. 4, 1972

[21] Appl. No.: 215,311

[52] U.S. Cl. .................. 425/380, 425/133, 264/97
[51] Int. Cl. ............................................. B29f 3/02
[58] Field of Search ........... 425/380, 381, 382, 376, 425/133; 264/98, 99, 209

[56] References Cited
UNITED STATES PATENTS
3,345,690   10/1967   Hagen ............................. 425/145

FOREIGN PATENTS OR APPLICATIONS
1,261,657   2/1968   Germany ........................... 425/133

Primary Examiner—R. Spencer Annear
Attorney, Agent, or Firm—Edwin E. Greigg

[57] ABSTRACT

In an extrusion head for forming tubular thermoplastic parisons, the base material emerging from an extruder is divided into two individual material flows, each of which is caused to spread circumferentially about a core in the course of its advance axially with respect to the core to form two tubular coaxial flows, each having a longitudinally extending seam zone. The two coaxial tubes are united in the extrusion head to form a parison in which any seam zone extends only half way through the wall thickness.

12 Claims, 11 Drawing Figures

APPARATUS FOR MAKING TUBULAR PARISONS OF THERMOPLASTIC MATERIAL

BACKGROUND OF THE INVENTION

This invention relates to a method of and apparatus for making tubular thermoplastic parisons which have at least one longitudinally extending seam zone and wherein the base material is admitted in a flow which is at an angle with respect to the longitudinal axis of the parisons. In this type of parison-making, the parison is formed by causing the flowing mass of base material emerging from an extruder to spread continuously approximately 360° about the circumference of a core whereby the two edge zones of the continuously spreading flow merge with one another (that is, a weld or seam is formed) to obtain a hose-like or hollow cylindrical parison. Or, according to another possibility, the flow of the base material is divided, for example, into two partial flows, each of which spreads approximately 180° about a core, whereupon the two edge zones of one partial flow merge with the two edge zones of the other partial flow and thus a hollow cylindrical material flow results. After the merging of the edge zones a material flow of annular cross section is obtained. This latter flow is subsequently expelled as a hose-like parison by means of an injection nozzle.

The disadvantage of these known methods resides in the fact that the resulting hose in the zone in which the two edges of the material flow or the edges of the partial flows have been united, that is, in the longitudinally extending seam zones, a certain weak region prevails. The reason therefor may be derived from the fact that in the aforenoted seam zone the physical properties, particularly with respect to strength and similar characteristics, are inferior with respect to the other circumferential zones of the parison. Further, the seam zones may have a wall thickness which is somewhat smaller than elsewhere in the hose. These disadvantages are particularly strongly felt when the parison subsequent to its formation is further processed in a downstream disposed blow molding arrangement in which it is generally expanded. Due to such expansion, the disadvantages inherent in the longitudinal seam zones of parisons prepared according to conventional methods may be further magnified. Further, one has to reckon with the possibility that the seam zones are visible either on the hose-like parison itself or on the hollow body subsequently prepared therefrom, thus adversely affecting the final product from an esthetic point of view. In case the material flow is, as suggested hereinabove, divided into two partial flows which are subsequently reunited, the aforenoted disadvantages appear in a particularly pronounced manner since the number of the seam zones is greater.

OBJECTS, SUMMARY AND ADVANTAGES OF THE INVENTION

It is an object of the invention to provide an improved method and apparatus of the aforeoutlined type wherein the disadvantages discussed are either eliminated or at least substantially reduced.

It is a further object of the invention to provide an improved method and apparatus of the aforeoutlined type to ensure that the regions with disadvantageous properties caused by the seam zones are distributed in such a manner that the hose-like parison has, about its circumference, substantially uniform properties so that even during the course of its further processing, for example, by means of blow molding, there will appear no disadvantageous effects in the final product due to the presence of seam zones.

Briefly stated, according to the invention, the individual flows of material are advantageously first advanced at an angle with respect to the longitudinal axis of the parison and thereafter deflected to flow axially with an increasing width in the direction of the zone of radial fusion until the edges of the individual flows merge and an annular flow is obtained, whereby the seam zones of the finished parison are staggered with respect to one another in the circumferential direction. Stated differently, the finished parison has at least two seam zones, but each extends only approximately half way through the wall thickness of the parison and the seam zones are staggered with respect to one another in the circumferential direction. If the individual seam zones extend in a radial direction only half way through the wall thickness, a further condition is also met, namely, that the individual material flows have equal wall thicknesses; thus, in the resulting parison both halves of the wall thickness of the entire parison are derived from two individual flows. It is, however, also possible to divide the wall thicknesses in a different manner.

The method, according to the invention, may be performed by dividing a single base material flow into two or more individual flows. It is also feasible, however, to derive each individual flow from a separate base material flow. In such a case, two extruders are associated with a single common extrusion head.

Each individual material flow is capable of spreading through a circumference of 360°, whereby the two edges of each individual flow merge (that is, the edges are welded together) to form a hollow cylindrical individual flow. It is also feasible, however, to subdivide the individual flows into partial flows. In such a case the two partial flows derived from an individual flow spread about a circumference of 180° and then two such partial flows are united at their edges to form a hollow cylindrical single flow. In case of two individual flows it is advantageous to offset the seam zones by 180°, whereas, if each individual flow is subdivided into two partial flows then the advantageous spacing of seam zones along the circumference of the parison is 90°. If more than two individual or single flows are used, it may be generally said that the seam zones are advantageously staggered at an angle obtained by dividing 360 by the number of the single flows.

According to another characteristic of the invention, the two single flows may be, subsequent to dividing the base material flow, guided in opposed directions about 90° in a circumferential direction and then deflected 90° in the direction of the outlet nozzle of the injection head. Thereupon the single flows are preferably continuously spread in a circumferential direction to 360°, thus causing the two edges of each flow to merge under the formation of a connecting seam.

For performing the method according to the invention, there is provided an apparatus which has at least one extruder and a downstream arranged extrusion head which has a housing provided with at least one inlet opening for the thermoplastic material disposed at an angle to its longitudinal axis and a core which is disposed in the housing and which, together with the housing, bounds an annular chamber which merges into an extrusion nozzle. According to a further feature of the invention, the apparatus is so designed that two or more individual channels or channel systems are provided which preferably continuously widen in the circumferential direction of the core and which are substantially coaxial. Further, these channels are staggered in the circumferential direction of the core and merge in the direction of flow upstream of the injection nozzle into a common annular collecting channel. The individual channels, arranged coaxially with respect to one another, may each widen to 360° in a circumferential direction. According to another feature of the invention, each channel system is formed of two partial channels which widen to 180° in the direction of flow and merge into a common individual channel or directly into the collecting channel.

A structure has further been found advantageous wherein the inner channel or the inner channel system is bounded by the core and an externally arranged coaxial sleeve and the outer channel or the outer channel system is bounded by said sleeve and the housing. In case more than two channels or channel systems are present, then for each additional channel or each additional channel system there is provided an additional sleeve.

A further feature of the invention resides in the possibility to associate with each inlet opening a separate extruder. In this manner a parison may be formed which is made of materials having different properties. For example, a hollow body may be made, the inner wall layer of which is formed of a corrosion resistant material, whereas the outer wall layer consists of a material which has a particular mechanical strength.

The use of separate extruders, as discussed in the preceding paragraph, further finds application when the parison is to be made of materials having different color. The essential point with respect to the possibility of using different materials resides in the fact that the flows of base material are introduced into the extrusion head separately and they remain there separated until the formation of the annular individual flows. Consequently, the spacial arrangement of the flows is, in each instance, predictable and controllable.

According to a further feature of the invention, the annular collecting channel of the extrusion head is in communication with a storage chamber which may be emptied by pressure means. To obtain a particularly compact structural arrangement, the annular collecting channel and storage chamber are preferably arranged coaxially with respect to one another.

In addition to the advantages already discussed hereinabove, a further essential advantage according to the invention resides in the fact that with the aid of simple means there is achieved an important improvement in the properties of the hose-like parisons and the final products made therefrom. At the same time the apparatus, particularly the extrusion head, remains structurally clear and simple. It is further advantageous that the teaching according to the invention may find application in general, thus, for example, in extrusion heads either with or without a storage chamber.

The invention will be better understood as well as further objects and advantages will become more apparent from the ensuing detailed specification of several exemplary embodiments taken in conjunction with the drawing.

DESCRIPTION OF THE EMBODIMENTS

Figure 1:
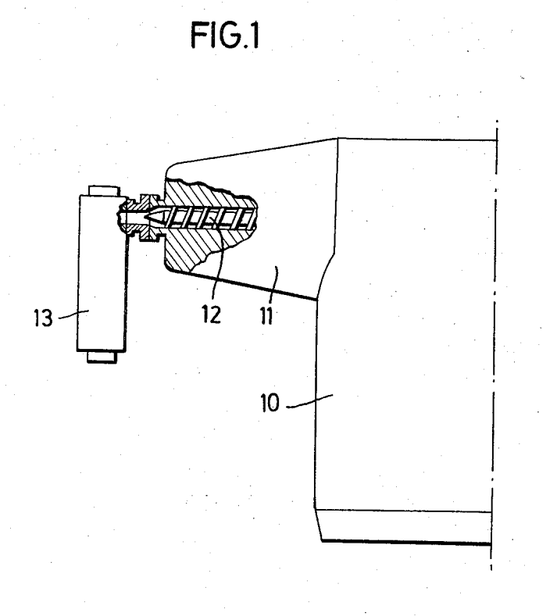
FIG. 1 is a schematic side elevational view of an extruder head with a downstream arranged extrusion head, partially broken away.

Turning now to FIG. 1, there is shown in a machine frame 10 a worm-type extruder 11 in which the thermoplastic material is plasticized and conveyed by means of a worm 12 to an extrusion head 13.

Figures 2, 3, 4, 5:
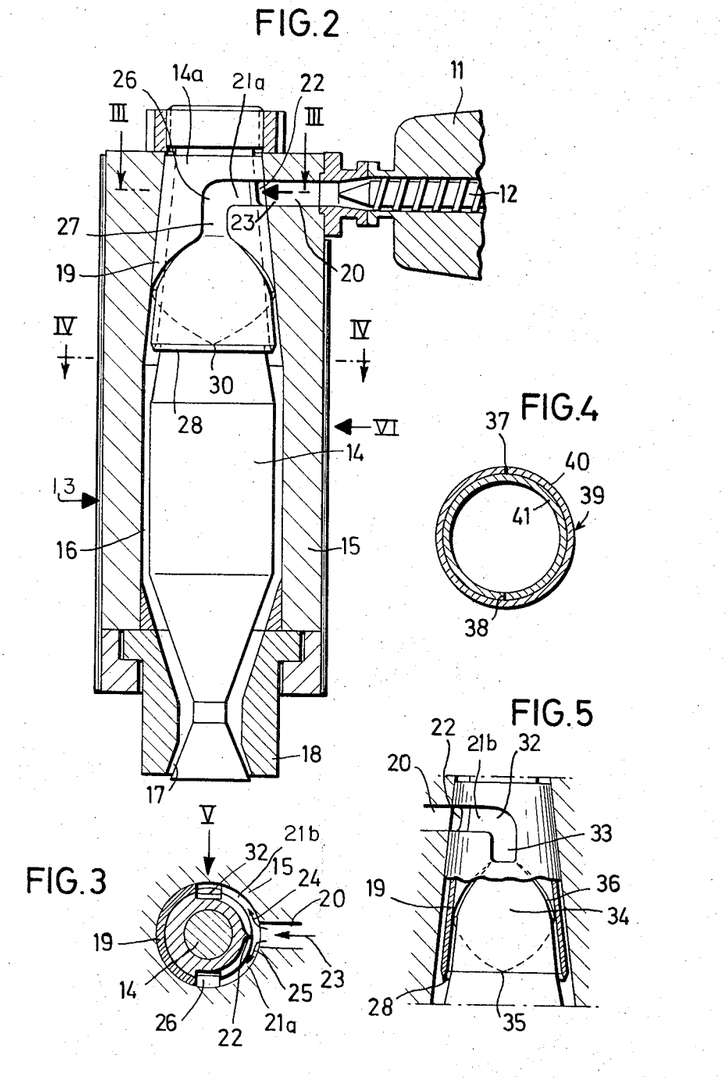
FIG. 2 is a longitudinal sectional view of a first embodiment of an extrusion head.
FIG. 3 is a sectional view along line III—III of FIG. 2.
FIG. 4 is a cross-sectional view of a parison within the extrusion head taken along lines IV—IV of FIG. 2.
FIG. 5 is a side elevational view of the structure shown in FIG. 2, taken from the opposite side, in the direction of arrow V shown in FIG. 3.

Turning now to FIG. 2, there is shown the extrusion head 13 formed substantially of a core 14 and a housing 15. In the middle and lower range of the extrusion head 13 the outer face of the core 14 and the inner wall of the housing 15 define an annular channel 16. The latter continues at the lower end of the extrusion head 13 as an extrusion nozzle 17 which is bounded by the core 14 and a nozzle jacket 18. The latter is secured — for example, by suitable clamping means — to the housing 15 proper of the extrusion head 13. Although the core 14 is illustrated in FIG. 2 as a single-piece component, it is to be understood that it may be made of a plurality of parts.

Figure 6:
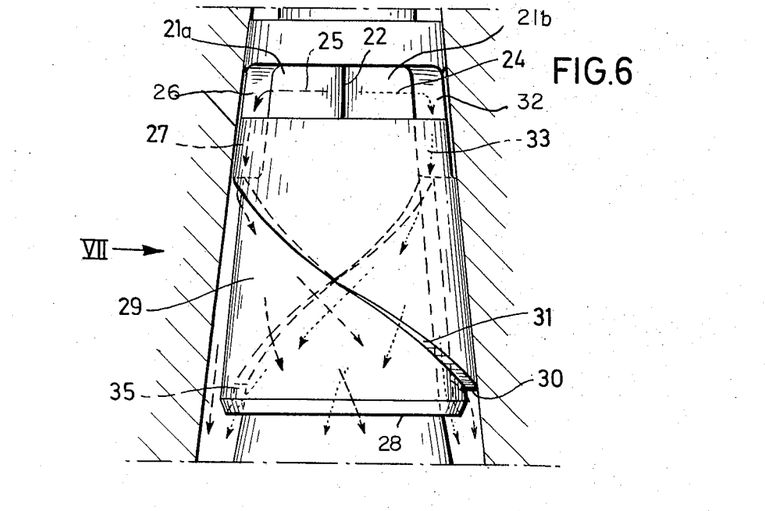
FIG. 6 is an enlarged side elevational view of a detail of the extrusion head, taken in the direction of arrow VI in FIG. 2.
Figure 7:
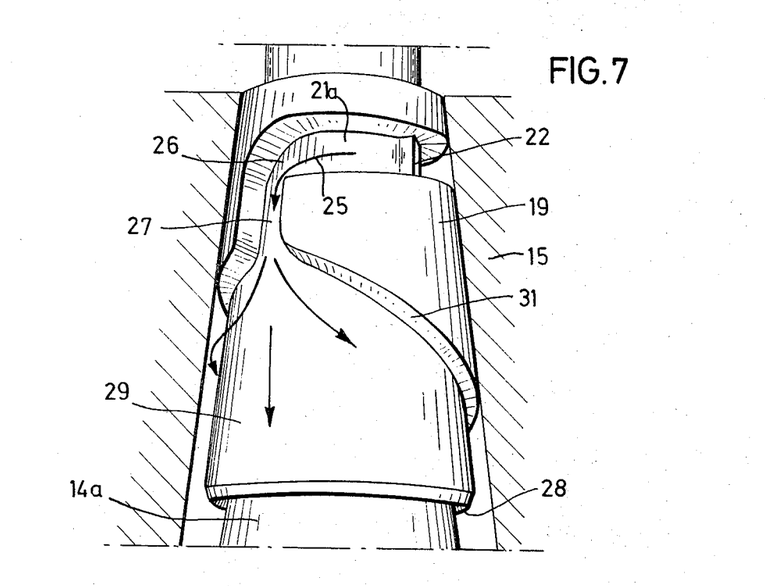
FIG. 7 is a view taken in the direction of arrow VII of FIG. 6.

The housing 15 is provided with a radial inlet channel 20 receiving the thermoplastic material advanced by the worm 12 of the extruder 11. Downstream of the inlet channel 20 there extends a connecting channel 21a, 21b which at the outside is bounded by the housing 15 and at the inside is bounded by a sleeve 19 arranged coaxially with the core 14 at the upper portion 14a thereof. The sleeve 19 has, at its side facing the inlet channel 20 a cutter projection 22 which splits up the material advancing in the inlet channel 20 in the direction of the arrow 23. FIGS. 3, 6 and 7 indicate that the two resulting individual flows progress in the direction of the arrows 24 and 25 arcuately approximately 90° in opposite directions about the core 14. Approximately 90° from the cutter 22 the two individual flows 24 and 25 are deflected 90° in the direction of the extrusion nozzle 17. For a better differentiation between the two material flows in FIG. 6, they are indicated with differently drawn arrows. Thus, the partial flow 25 advancing leftward from the cutter 22 is represented by arrows drawn with dash lines, whereas the rightward progressing partial flow 24 is represented by arrows drawn with dots.

As noted before, the connecting channel 21a, 21b is situated between the sleeve 19 and the housing 15. The channel portion 21a of the connecting channel 21a, 21b situated to the left of the cutter 22 is at 26 (shown in FIGS. 2, 3, 6, 7) deflected 90° downward. The downstream adjoining coupling channel 27 which extends in the direction of the extrusion nozzle 17 continuously and sharply widens after a short distance from the deflection point 26 until it reaches, at the lower end 28 of the sleeve 19, a circumference of 360°. It follows that the individual flow 25 which is deflected leftward by the cutter 22 and which flows downwardly in the coupling channel 27 continuously widens in the range 29 between the coupling channel 27 and the lower end 28 of the sleeve 19 until, eventually, the two edges of the flow merge and are thus reunited at the lower end 30 of the bounding edges 31 of the zone 29. Thus, in point 30 a tubular material flow is generated from the individual flow 25.

The second individual flow 24 which is deflected by the cutter 22 towards the right (FIG. 6) and which proceeds in the connecting channel portion 21b is also deflected at 32 about 90° in the direction of the extrusion nozzle 17 after advancing approximately 90° in the circumferential direction. This deflection point 32 is positioned diametrically opposite the deflection point 26 of the first-discussed individual flow 25. Stated differently, the two deflection points 26 and 32 are staggered 180° with respect to one another as related to the core 14.

The coupling channel 33 situated downstream of the deflecting point 32 is located between the sleeve 19 and the upper portion 14a of the core 14. The same applies to the adjoining range 34 in which the channel 33 continuously widens until it eventually reaches a circumference of 360° at the lower point 35 of the bounding edges 36. Stated differently, the individual flow 24 too, after passing through the coupling channel 33, continuously widens in the range 34 until, at the height of the point 35 which lies at the same level as the point 30 discussed in connection with the individual flow 25, it forms a flow of closed annular cross section. Thus, at the point 35 as at point 30, a longitudinally extending seam zone is formed.

From what was said in the foregoing, it is apparent that in the range between the inlet channel 20 and the lower end 28 of the sleeve 19, there are formed two individual flows of hollow cylindrical cross section which are arranged coaxially with respect to one another. At the moment of their formation the two individual tubes remain separated from one another by the wall of the sleeve 19, as clearly shown in FIG. 5. At the lower edge 28 of the sleeve 19 the two individual tubes enter the annular collecting channel 16 where they are united with one another. The result is a hose-like parison 39 which, as shown in FIG. 4, is provided with two seam zones 37 and 38 staggered 180° with respect to one another. It is an essential feature of this structure that each of the two seam zones extends only approximately one-half through the wall thickness of the parison 39. The latter is thus composed of two coaxially arranged individual tubes 40 and 41, whereby the outer tube 40 results from the partial flow 25 and the inner tube 41 results from the partial flow 24. The seam zone 37 situated in the outer tube 40 is derived from the fusion of the two edges of the outer material flow 25 at point 30, whereas the seam zone 38 of the inner tube 41 is derived from the fusion of edges of the inner material flow 24 at point 35. Since the two tubes 40, 41 are brought into contact with one another at a distance from the extrusion nozzle 17, it is ensured that from the location of unification, that is, from the lower edge 28 of the sleeve 19 until the outflow from the injection nozzle 17 both individual tubes 40, 41, assume a close contacting relationship with one another in a radial direction, so that, as a result, a homogeneous one-piece parison emerges from the extrusion nozzle 17.

It may be observed, particularly in FIG. 6, that the lower edge 28 of the sleeve 19 is located lower than points 30 or 35. Thus, when the two tubes 40, 41 enter into the annular collecting channel 16 they are already entirely closed around their respective circumference.

Figure 8:
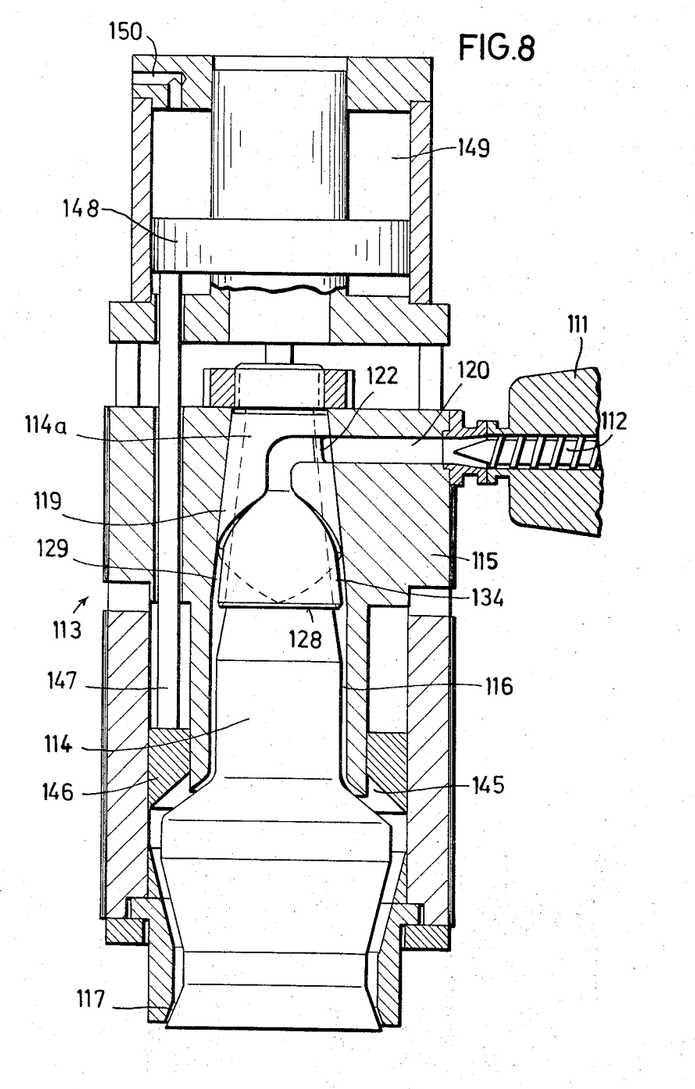
FIG. 8 is a longitudinal sectional view of an extrusion head according to FIG. 2 provided with a storage chamber.

The embodiment according to FIG. 8 corresponds to that shown in FIG. 2 as far as the guiding of the thermoplastic material and the formation of the coaxial tubes are concerned. Accordingly, components in the embodiment according to FIG. 8 corresponding to those shown in FIG. 2 are designated with reference numerals increased by 100. The material enters through a substantially radial inlet channel 120 into the extrusion head 113 which has a core 114 and a housing 115. The core 114 carries at its upper portion 114a a sleeve 119. The material flow emerging from the inlet channel 120 is divided by means of a cutter 122 into a leftward and a rightward proceeding individual flow. Each of the two individual flows are caused to form two coaxial tubular flows in coaxially arranged ranges or channels 129 and 134. Both individual tubular flows enter at the lower edge 128 of the sleeve 119 into an annular collecting channel 116 in which the individual tubular flows are combined in a manner described hereinabove.

The difference between the embodiment according to FIG. 8 and that of FIG. 2 resides in the fact that the extrusion head, according to FIG. 8, is provided with a storage chamber 145 in which there is guided an annular piston 146 connected with an annular power piston 148 by means of connecting rods 147 (only one shown). The power piston 148 is displaceable by pressure means introduced into an annular cylinder 149 in which the piston 148 is situated. In the drawing the pistons 146, 148 are shown in their next to the lowest position. Provided that the pressure fluid in the annular cylinder 149 may flow out through a discharge port 150, the material delivered by the worm 112 into the injection head 113 effects an upward displacement of the piston 145, so that the material is first delivered into the storage chamber 145. There are no particular measures necessary to ensure this occurrence since the flow resistance in the injection nozzle 117 is substantially larger than the resistance which the piston 146 encounters during its upward displacement under the aforenoted conditions. As soon as the piston assembly 146, 148 has reached its upper terminal position or any other preadjusted intermediate position, the annular power cylinder 149 is filled with a pressurized medium through the port 150 and, as a result, the annular power piston 148 and the annular piston 146 are displaced downwardly, effecting an emptying of the storage chamber 145. Stated differently, the material swelling in the storage chamber 145 is, by means of the extrusion nozzle 117 expelled outwardly and downwardly within a very short period. The advantage of this arrangement resides in the fact that a continuous operation and delivery of the extruder 111 is possible despite an intermittent extrusion operation. The storing function of the extrusion head is described in U.S. Pat. No. 3,345,690 to Hagen, issued Oct. 10, 1967.

Figures 9, 10, 11:
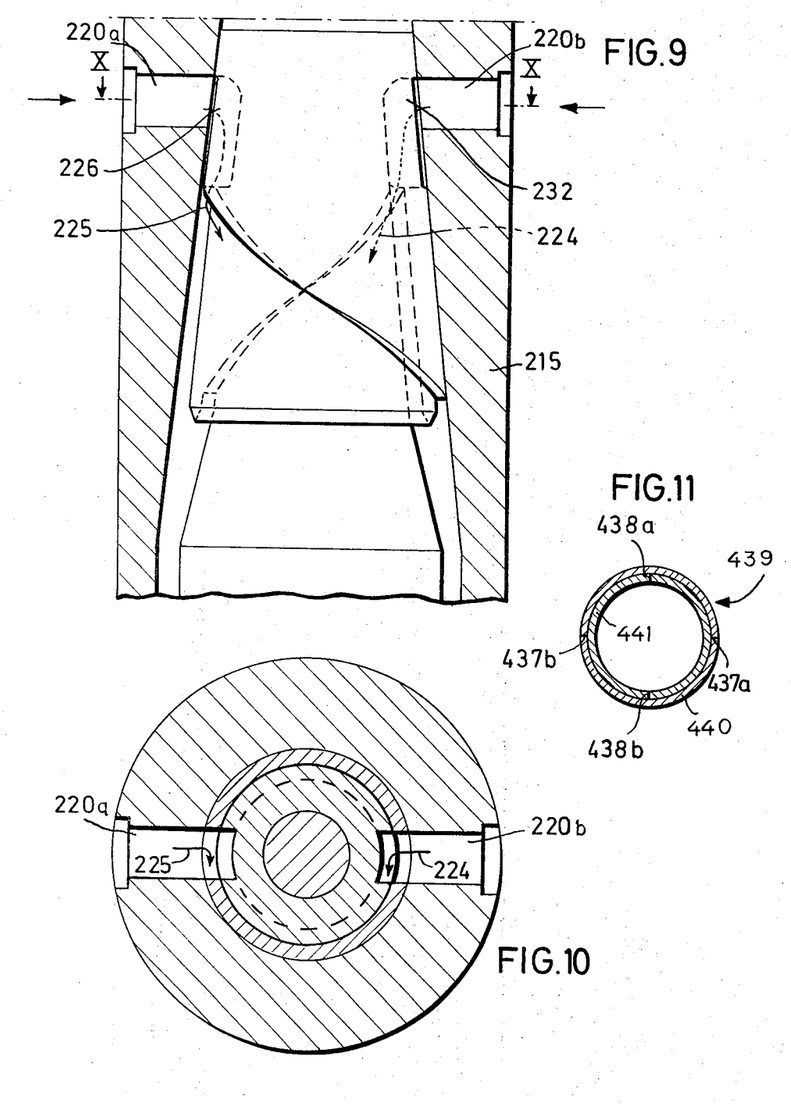
FIG. 9 is a side elevational view illustrating a detail of an extrusion head according to another embodiment.
FIG. 10 is a sectional view taken along line X—X of FIG. 9.
FIG. 11 is a cross-sectional view of a parison made of two coaxial tubes each formed by a plurality of partial flows.

Turning now to the embodiment shown in FIG. 9, the components which correspond to those according to the embodiment of FIGS. 2–7 are given the same reference numerals increased by 200. The housing 215 is provided with two diametrically oppositely located inlet channels 220a, 220b, with each of which there is associated a separate, upstream connected extruder (not shown). Stated differently, both individual flows 224 and 225 are derived from a separate extruder and are thus not a division of a single material flow as it was the case in the embodiments described earlier. It is apparent from FIG. 9 that both inlet channels 220a, 220b immediately join the respective ranges 226 and 232 in which each respective material flow 225 and 224 is deflected approximately 90° downwardly in the direction of the injection nozzle (not illustrated in FIGS. 9 and 10). Thus, the connecting channels 21a, 21b in the embodiment according to FIGS. 2–7 are here omitted. As far as other details are concerned, the embodiment according to FIGS. 9 and 10 corresponds to that according to FIGS. 2–7.

It has already been mentioned in the introductory part of this specification that it is possible to provide, in lieu of individual flows which widen to 360°, two partial flows which widen each 180° and then flow together in the circumferential direction. Thus, in such a case two partial flows merge at the edges to form one tubular flow and then the two coaxial tubular flows are combined as described hereinabove. FIG. 11 shows a cross section of a parison 439 prepared in this manner. The outer tube 430 has two diametrically opposite seam zones 437a and 437b, while the inner tube 441 has two diametrically opposite seam zones 438a, 438b. Thus, the parison 439 has a total of four seam zones, each staggered 90° with respect to an immediately adjacent seam zone. It is thus seen that at any location of the parison wall where a seam zone is present, such zone extends only through one-half of the thickness of the wall. In this manner, a weakening of the wall is avoided in accordance with the invention.

What is claimed is:

1. In an apparatus for making tubular parisons, said apparatus being of the type that includes at least one extruder and an extrusion head coupled downstream thereof and having a housing provided with at least one inlet channel extending from said extruder at an angle with respect to the longitudinal axis of said extrusion head, a core disposed in said housing and defining, with the inner wall thereof, an annular chamber, an extrusion nozzle adjoining said annular chamber, the improvement in said extrusion head comprising, A. at least two individual channels extending from said inlet channels towards said extrusion nozzle coaxially with respect to one another and said core, said individual channels widening concentrically about the circumference of said core in the direction of said extrusion nozzle for forming at least two concentric partial parisons, each individual channel having 1. an upstream end communicating at least indirectly with an associated inlet channel and
2. a downstream end and B. a sole annular collecting channel disposed downstream of said individual concentric channels and communicating with said downstream end thereof for shaping said concentric partial parisons into a complete parison.

2. An improvement as defined in claim 1, each said individual channel widening to 360°.

3. An improvement as defined in claim 2, wherein the locations of widest points in each channel are circumferentially spaced.

4. An improvement as defined in claim 3, wherein said locations are circumferentially spaced 180° with respect to one another.

5. An improvement as defined in claim 1, each individual channel being formed of two partial channels widening to 180° in the direction of said injection nozzle.

6. An improvement as defined in claim 5, wherein said partial channels merge into a common individual channel.

7. An improvement as defined in claim 5, wherein said partial channels merge directly into said sole annular collecting channel.

8. An improvement as defined in claim 1, including circumferentially extending connecting channels, each establishing communication between an individual channel and its associated inlet channel.

9. An improvement as defined in claim 1, including a sleeve disposed coaxially with and spaced from said core, one of said individual channels extending between said core and said sleeve and one of said individual channels extending between said sleeve and said housing.

10. An improvement as defined in claim 9, including additional sleeves disposed coaxially with and spaced from said first-named sleeve, each additional sleeve bounding an additional individual channel.

11. An improvement as defined in claim 1, including a plurality of extruders, one associated with each inlet channel.

12. An apparatus for making tubular parisons of material extruded from at least one extruder coupled thereto comprising:
a housing provided with an inlet to receive said extruded material;
core means disposed in said housing and spaced from an inner wall of said housing to define an annular chamber to receive said extruded material;
a collection channel and extruder nozzle means downstream of said collection channel; and
at least two channel means opening into said inlet and connected to said collection channel and widening about the periphery of said core and directing said extruded material circumferentially into at least two tubular concentric partial parisons whose scans are circumferentially offset as the extruded material flows through said channel means and ultimately into said collection channel, said channel means and said collecting channel being formed so as to mold said partial concentric parisons contiguously as the complete parison flows from said extruder nozzle.

* * * * *

UNITED STATES PATENT OFFICE
CERTIFICATE OF CORRECTION

Patent No. 3,801,254  Dated  April 2, 1974

Inventor(s)  ALBERT GÖDTNER

It is certified that error appears in the above-identified patent and that said Letters Patent are hereby corrected as shown below:

Priority claimed and based upon

German Application P 21 00 192.3-16 filed January 4, 1971.

Signed and sealed this 12th day of November 1974.

(SEAL)
Attest:

McCOY M. GIBSON JR.                    C. MARSHALL DANN
Attesting Officer                     Commissioner of Patents